3,313,834
PROCESS FOR THE MANUFACTURE OF
FATTY ACID ESTERS
Robert R. Allen and Robert L. Campbell, Jr., Sherman,
Tex., assignors to Anderson, Clayton & Co., Houston,
Tex., a corporation of Delaware
Filed Mar. 17, 1964, Ser. No. 352,513
9 Claims. (Cl. 260—410.6)

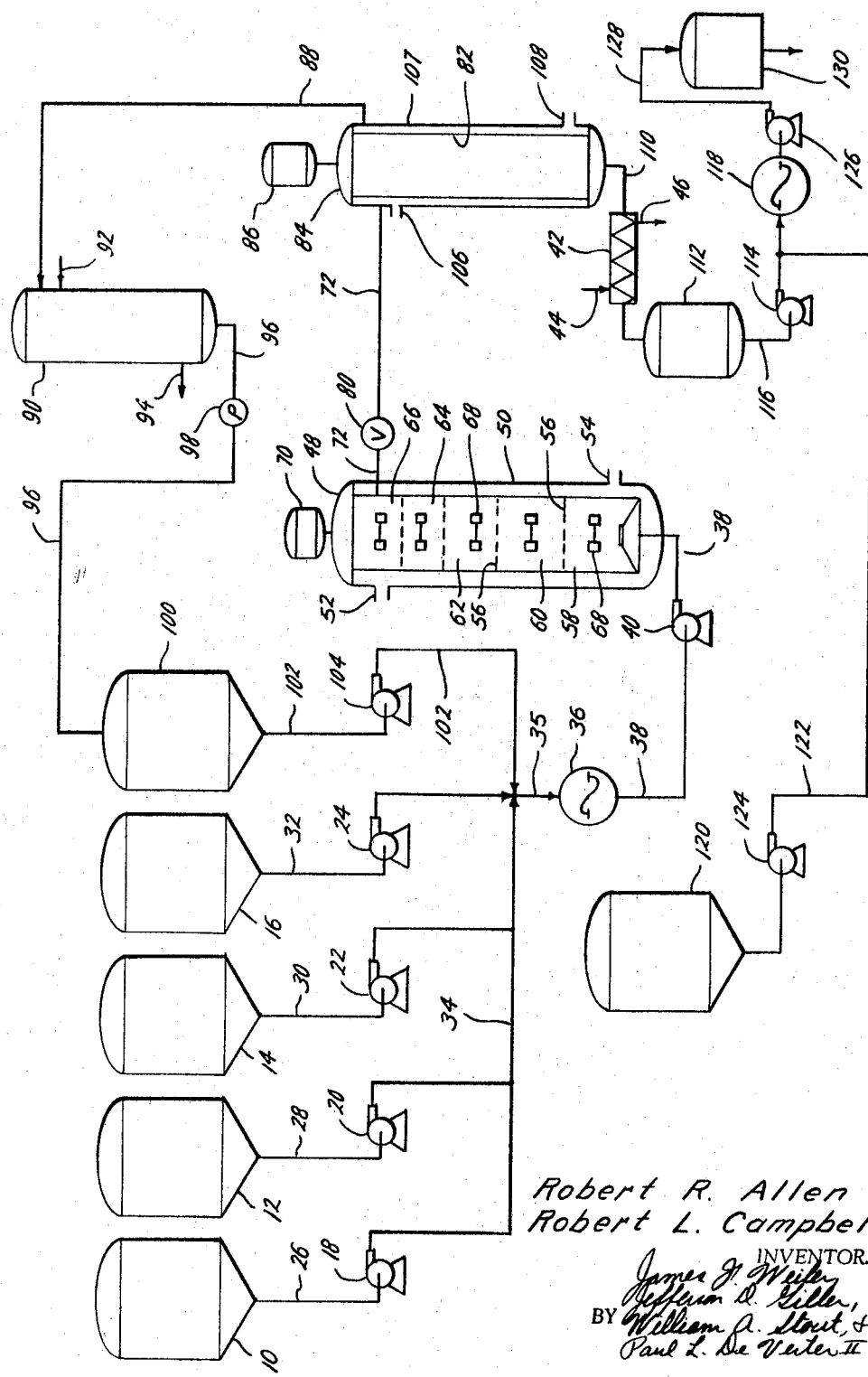

This invention relates to a process for the manufacture of fatty acid esters and more particularly to a continuous process therefor.

Monoesters of fatty acids are desirable for, among other things, emulsifiers. Such esters are formed by the reaction of one or more polyhydric alcohols and one or more fats in the presence of an ester-interchange catalyst. This results in a mixture of unreacted alcohol, unreacted fat, mixed esters, and the catalyst. By various steps the unreacted alcohol and the catalyst are separated from the mixture leaving a remainder or residue consisting of unreacted fat and a mixture of esters which is used as an emulsifier. That is, no attempt is made to separate the unreacted fat from the mixed esters or the esters from each other. Such process is normally carried out as a batch rather than a continuous process.

It is a general object of the present invention to provide a continuous process for economical and efficient production of fatty acid esters.

Another general object of the present invention is to provide such a process in which the catalyst is economically and efficiently removed from the fatty acid esters.

When fat and polyhydric alcohol react in the presence of an ester-interchange catalyst to form the mixed esters an equilibrium condition will be reached at any given temperature and for any given ratio of reactants. When the alcohol is removed at temperatures at which the catalyst is active the reaction reverts and a portion of the esters is changed back to alcohol and fat which results in decreased efficiency. Attempts have been made to remove the catalyst from the equilibrium mixture before it reverts but because catalysts normally used are soluble in glycerine this is difficult to do. Attempts have also been made to quickly cool batches of reactants from the temperature at the desired equilibrium to a temperature at which the catalyst is no longer active. However, as the commercial batches are often 10,000 pounds or more in size this cooling cannot take place quickly enough without unreasonably expensive equipment. If the cooling does not take place quickly enough the unreacted alcohol will separate from the mixture as the mixture is cooling which has the effect of removing the alcohol from the mixture and causes the reaction to reverse.

A more particular object of the present invention is to provide a process for manufacture of fatty acid esters in which there is continuously withdrawn from a reaction vessel portions of the mixture of alcohol, fat, catalyst, and esters at the equilibrium conditions existing in the reaction vessel, the unreacted alcohol is vacuum film distilled, and the residue is quickly cooled to below approximately 350° F.

Another object of the present invention is to provide a process in which the catalyst is removed by adding sufficient acid or base, depending upon whether the catalyst is alkaline or acid, to substantially neutralize the catalyst and form a salt of the catalyst and acid or base while the catalyst is in a liquid in which the salt formed is insoluble and then removing the salt by filtration.

Other and further objects, features, and advantages will be apparent from the following description of the presently preferred examples of the present invention, given for the purpose of disclosure, and taken in conjunction with the accompanying drawing.

The present invention is based upon the discovery that mixed monesters of high commercial value can be economically produced by (1) maintaining a mixture of fat, polyhydric alcohol, and ester-interchange catalyst and the monesters resulting from the reaction of the fat and alcohol at equilibrium at the temperatures most efficient for the production of the maximum amount of esters, (2) continuously introducing more fat, polyhydric alcohol, and catalyst to the reaction vessel, (3) continuously withdrawing from the reaction vessel a portion of the mixture at equilibrium at the temperature in the reaction vessel and at the same rate as the material of step 2 is added to the reaction vessel, (4) vacuum film distilling alcohol from the portion of the mixture withdrawn at a pressure between about 3 and 50 mm. Hg and at a temperature above that of the boiling point of the alcohol but below the boiling point of the esters, (5) cooling the residue of the distillation to a temperature below approximately 350° F. within less than approximately 10 minutes from the time the mixture is withdrawn from the reaction vessel, (6) adding sufficient acid or base, depending upon whether the catalyst is alkaline or acid, to the residue resulting from step 5 to subpartially neutralize the catalyst in the residue and form a salt of the catalyst and acid, and (7) separating by filtration the salt formed in step 6.

Preferably the distillation is carried out at approximately 420° F. and at a pressure between about 3 and 10 mm. Hg and the cooling is accomplished within two minutes of the time the mixture leaves the reaction vessel. The material added to the reaction vessel is added at one end and the material continuously withdrawn therefrom is withdrawn from the other end so that it is at equilibrium at the desired reaction temperature. By continuously withdrawing and cooling a portion of the reactants these reactants can be cooled much quicker to the desired temperature than if an entire batch of reactants were attempted to be cooled. It is essential that the cooling take place within approximately 10 minutes from the time the reactants leave the reaction vessel, otherwise the reversion is so great that much of the benefit of the process is lost.

The residue from the vacuum film distillation contains the catalyst, the mixed esters, and unreacted fat. When the catalyst is neutralized it forms a salt termed "ash" in the trade which is deleterious as it clogs processing equipment and gives an undesirable flavor to products utilizing the esters. Because of this the ash must be removed. This ash would be soluble in glycerine and hence difficult to remove. However, after the glycerine has been removed by the vacuum film distillation the ash can be easily removed by filtration as it forms large filterable crystals in the mixture of esters and unreacted fat.

Not only must the reactants be cooled to below about 350° F. to prevent reversion but if the residue from the distillation step is above about 350° F. at the time the catalyst is neutralized the acid or base used to neutralize the catalyst will react with some of the esters and form a soluble deleterious compound which is extremely difficult to remove.

Referring now to the figure there is illustrated a schematic flow diagram of an apparatus which may be used with the process of the present invention. Supply tanks 10 and 12 hold alcohol, a supply tank 14 holds catalyst, and a supply tank 16 holds fat. Centrifugal pumps 18, 20, 22, and 24, in the lines 26, 28, 30 and 32 from the supply tanks 10, 12, 14, and 16, move the contents of those supply tanks through those lines, the common lines 34 and 35, and into a mixer 36 in which the material from the supply tanks is thoroughly blended. The blended material from the mixer 36 is forced through a line 38 by a pump 40 to the lower end of an upstanding tubular reaction vessel 48 surrounded by a heating jacket 50 for heating the contents of the reaction vessel 48 by introducing a fluid heating medium, such as a mixture of diphenyl and diphenyl oxide, at the lines 52 and allowing it to leave at the line 54.

Within the reaction vessel 48 are a series of vertically spaced horizontal doughnut-shaped plates 56 forming a series of compartments, 58, 60, 62, 64, and 66. Within each of these compartments 58 through 66 is a paddle 68 of a mixer driven by a motor 70. The blend entering the reaction vessel 48 from the mixer 36 moves upwardly through the reaction vessel 48 by passing through openings in the plates 56 as more blend is forced into the reaction vessel 48 from the line 38. As the blend moves upwardly it is heated to the desired reaction temperature and establishes an equilibrium mixture of alcohol, fat, and mixed esters. The temperature is above 350° F. as temperatures in excess of this amount are used to provide the maximum percentage of esters in the equilibrium. Normally the contents of the reaction vessel 48 are held under a positive pressure of from about 5 to 50 p.s.i.g. in order to maintain low boiling alcohols as a liquid in the reaction vessel 48.

The amount and kind of alcohol and fats and the temperature to produce the maximum amount of any particular desired esters are well known in the trade, do not as such constitute the present invention, and no further description of factors dictating the selection of ingredients and temperatures is necessary.

A portion of the equilibrium mixture within the reaction vessel 48 is continuously withdrawn from near the top of the reaction vessel 48 through a line 72 and passed through a back pressure valve 80 which permits a pressure above atmospheric on the upstream side of the valve 80 and a vacuum on the downstream side of the valve 80.

The mixture flows from the valve 80 through the line 72 into the upper end of a vacuum film evaporator 84. As the mixture enters the evaporator 84 it is contacted by blades, not shown, rotated by a motor 86 which forces or "wipes" the mixture in a thin film against the internal wall 82 of the evaporator 84 and as the mixture descends the wall 82 the alcohol in the mixture is distilled and passes out the upper end of the evaporator 84 through a line 88 into a condenser 90 cooled by a cooling medium, such as water, entering the condenser 90 at the line 92 and leaving at the line 94.

The condensed alcohol is pumped from the condenser 90 through a line 96 by a pump 98 and forced into a supply tank 100 connected by a line 102 through a centrifugal pump 104 to the common supply line 35 so that the recovered unreacted alcohol may be used as feed.

Within the evaporator 84 the pressure is maintained between about 3 and 50 mm. Hg. and the temperature below the boiling point of the esters at the pressure in the evaporator but above the boiling point of the alcohol in the mixture. This temperature is maintained by supplying sufficient heat to the internal wall 82 of the evaporator 84 to offset the cooling effect of the evaporation of the alcohol. This heat is supplied by introducing a fluid heating medium, such as a mixture of diphenyl and diphenyl oxide, entering a line 106 of a jacket 107 and allowing it to leave at a line 108. Vacuum film evaporators such as the evaporator 84 used here are well known and no further description of this evaporator 84 is necessary.

The residue of esters, unreacted fat, and catalyst in the evaporator 84 is continuously withdrawn from the lower end of it through a line 110 and immediately passed through a heat exchanger 42 which cools the residue by means of water entering the heat exchanger 42 at a line 44 and leaving at a line 46. This heat exchanger 42 cools the residue to below approximately 350° F. within 10 minutes of the time that portion of the residue cooled left the reaction vessel 48.

From the heat exchanger 42 the residue flows to a product receiving vessel 112 from which it is moved by a centrifugal pump 114 in a line 116 to a mixer 118 where it is mixed with a catalyst neutralizing acid or base pumped from a storage tank 120 through a line 122 by means of a centrifugal pump 124.

Within the mixer 118 the neutralizing material reacts with the catalyst, producing salts (ash) in the form of large crystals. The ash, fats, and esters are then moved by a pump 126 through a line 128 to a filter 130 which holds the ash formed in the mixer 118 and allows the mixed esters and unreacted fat to pass on through to storage.

As the figure is schematic various conventional controls, instrumentation, vacuum equipment for the evaporator 84, and other accessories have been omitted.

Set forth hereafter are different examples of the process of the present invention.

EXAMPLE 1

Refined soyban oil at a rate of 65 parts per minute was mixed with a stream of glycerol containing 0.29% sodium hydroxide and flowing at a rate of 29.2 parts per minute. This blend flowed into a reaction vessel in which it was heated to 480° F. under a pressure of 40 p.s.i.g. The equilibrium mixture was withdrawn from the reaction vessel at the same rate at which the reaction vessel was fed, that is, 94.2 parts per minute. The mixture withdrawn from the reaction vessel passed to a vacuum film evaporator which had the temperature of its internal wall maintained at 420° F. and 3 mm. Hg pressure. The distilled glycerol was withdrawn from the evaporator at a rate of 21 parts per minute and returned to supply for further use. The residue from the evaporator was withdrawn at the rate of 73 parts per minute and and cooled to 335° F. within approximately 2 minutes of the time the mixture containing this residue left the reaction vessel. To the residue was added sufficient $H_3PO_4$ of 85% strength equal 0.25% of the residue. After mixing, large crystals of salt formed which crystals were removed by filtration. The product after filtration contained 58.2% alpha monoglyceride esters of soybean oil fatty acid and only 100 parts per million of ash. Ash content less than 300 parts per million is considered by the trade to be excellent.

EXAMPLE 2

Refined lard at a rate of 65.5 parts per minute was mixed with a stream of glycerol containing 0.22% sodium hydroxide and flowing at a rate of 27.5 parts per minute. This bend flowed into a reaction vessel in which it was heated to 480° F. under a pressure of 40 p.s.i.g. The equilibrium mixture was withdrawn from the reaction vessel at the same rate at which the reaction vessel was fed, that is, 93 parts per minute. The mixture withdrawn from the reaction vessel passed to a vacuum film evaporator which had an internal wall temperature of 420° F. and 3 mm. Hg pressure. The distilled glycerol was withdrawn from the evaporator at a rate of approximately 20 parts per minute and was returned to supply for further use. The residue from the evaporator was withdrawn at the rate of 73 parts per minute and cooled to 340° F. within approximately 2 minutes of the time the mixture containing this residue left the recation vessel. To the residue was added sufficient $H_3PO_4$ of 85% strength to equal 0.23% of the residue. After mixing, large crystals of salt formed which crystals were removed by filtration. The product after filtration contained 58.7% alpha monoglyceride esters, 135 parts per million ash and 0.4% free glycerol.

EXAMPLE 3

Soybean oil at the rate of 71.6 parts per minute, a mixture of 69.4% propylene glycol and 30.6% glycerol at the rate of 48.2 parts per minute, and propylene glycol containing 0.7% sodium hydroxide at the rate of 10.8 parts per million were blended and passed into a reaction vessel which maintained its contents at 450° F. and under about 40 p.s.i.g. From the reactor the equilibrium mixture was withdrawn at the same rate as the feed into the reaction vessel and passed to a vacuum film evaporator which had an internal wall temperature of 420° F. and 3 mm. Hg pressure. The distillate from the evaporator was approximately 30% glycerol and 70% propylene glycol and was thereafter used as feed to the reaction vessel. The residue was continuously withdrawn from the evaporator and cooled to 325° F. within approximately 2 minutes of the time it left the reaction vessel. This residue, after cooling, was mixed with 85% strength $H_3PO_4$ and filtered and upon analysis was found to contain 25.4% monoglycerides and 39% monoesters of propylene glycol.

EXAMPLE 4

From the various supply tanks a mixture of 54.8% hydrogenated tallow, 11.3% glycerol, 33.9% propylene glycol, and 0.5% sodium hydroxide was pumped into a reaction vessel maintained at between 415 and 420° F. The equilibrium mixture was continuously withdrawn and passed to a vacuum film evaporator which was maintained at 4 mm. Hg pressure and 390° F. The distillate from the evaporator was composed of from 63 to 68% propylene glycol and 32 to 37% glycerine and was recirculated into the reaction vessel after the addition of sufficient propylene glycol to maintain the desired ratio in the mixture added to the reaction vessel. The residue from the exaporator was cooled to between 320 and 325° F. within 2 minutes of the time its contents left the reaction vessel. This residue contained 50 to 52% propylene glycol monoesters, 23 to 25% glycerol monoesters, and 0.14 to 0.18% free glycerine in addition to the catalyst. This residue was treated with sufficient $H_3PO_4$ to equal 0.18% of it and the resultant salts removed by filtration resulting in a product which contained only 50 to 80 parts per million ash.

Suitable fats for use with the present process include marine oils such as fish oil and whale oil; animal fatty material such as tallow, wool grease, and lard; and vegetable oil such as soybean oil, cottonseed oil, corn oil, olive oil, castor oil, and peanut oil, either hydrogenated or unhydrogenated.

The alcohols which may be used are polyhydric alcohols (those containing two or more hydroxyl groups in the molecule) and those particularly suitable for use include the polyhydroxy alkanes such as glycerol, sorbitol, manitol; ether alcohols such as diglycerol and polyglycerols; alkylene glycols such as trimethylene glycol, ethylene glycol, propylene glycol, polyethylene glycols, and polypropylene glycols.

The ester-interchange reaction catalysts include both acid and alkaline catalysts. Particularly suitable for the preparation of the desired mixtures are oxides or hydroxides of alkali or alkaline earth metal compounds such as sodium hydroxide, sodium methylate, and sodium carbonate. Bivalent metal compounds include calcium oxide, calcium hydroxide, and barium oxide. In short, the catalysts suitable for the process of the present invention include any of the well known ester-interchange catalysts.

The alkali catalysts are neutralized with any of the common acids used for such neutralization such as phosphoric acid, citric acid, and tartaric acid. The acid catalysts are neutralized with any base normally used to neutralize acid catalysts such as sodium hydroxide, potassium hydroxide and calcium hydroxide.

From the foregoing discussion, examples, and description of the invention, it is apparent that the objects set forth herein as well as others have been achieved. Those skilled in the art will recognize that the principles of this invention may be applied in several ways. Accordingly, the invention is to be limited only by the spirit thereof and the scope of the appended claims.

What is claimed is:
1. A process for the manufacture of fatty acid esters comprising:
   (a) maintaining in a portion of a reaction vessel a mixture of fat, polyhydric alcohol, and alkaline ester-interchange catalyst, and a monoester resulting from the reaction of the fat and polyhydric alcohol in the presence of the catalyst all at equilibrium at a temperature above about 350° F.,
   (b) continuously introducing more of the fat, polyhydric alcohol, and alkaline ester-interchange catalyst into the reaction vessel,
   (c) continuously withdrawing from the reaction vessel a portion of the mixture at equilibrium at the temperature in the reaction vessel and at the same rate that material of step (b) is added to the reaction vessel,
   (d) vacuum film distilling the alcohol from the portion of the mixture withdrawn at a pressure between about 3 and 50 mm. Hg and at a temperature above that of the boiling point of the alcohol and below the boiling point of the esters in the mixture,
   (e) cooling residue from step (d) below approximately 350° F. within approximately 10 minutes from the time that portion of the mixture left the reaction vessel,
   (f) adding sufficient acid to the residue resulting from step (d) to substantially neutralize the catalyst and form a salt of the catalyst and acid, and
   (g) separation of the salt formed in step (f) by filtration.

2. The process of claim 1 in which the cooling of step (e) is performed in approximately 2 minutes of the time that portion of the mixture left the reaction vessel.

3. The process of claim 1 in which the distillation of step (d) is carried out at approximately 420° F. and at a pressure between about 3 and 10 mm. Hg.

4. The process of claim 2 in which the distillation of step (e) is carried out at approximately 420° F. and at a pressure between about 3 and 10 mm. Hg.

5. A process for the manufacture of fatty acid esters comprising:
   (a) maintaining in a portion of a reaction vessel a mixture of fat, polyhydric alcohol, and acidic ester-interchange catalyst, and a monoester resulting from the reaction of the fat and polyhydric alcohol in the presence of the catalyst all at equilibrium at a temperature above about 350 F.,
   (b) continuously introducing more of the fat, polyhydric alcohol, and acidic ester-interchange catalyst into the reaction vessel,
   (c) continuously withdrawing from the reaction vessel a portion of the mixture at equilibrium at the temperature in the reaction vessel and at the same rate that material of step (b) is added to the reaction vessel,
   (d) vacuum film distilling the alcohol from the portion of the mixture withdrawn at a pressure between about 3 and 50 mm. Hg and at a temperature above that of the boiling point of the alcohol and below the boiling point of the esters in the mixture,
   (e) cooling residue from step (d) below approximately 350° F. within approximately 10 minutes from the time that portion of the mixture left the reaction vessel,
   (f) adding sufficient base to the residue resulting from step (d) to substantially neutralize the catalyst and form a salt of the catalyst and base, and
   (g) separation of the salt formed in step (f) by filtration.

6. The process of claim 5 in which the cooling of step (e) is performed in approximately 2 minutes of the time that portion of the mixture left the reaction vessel.

7. The process of claim 5 in which the distillation of step (d) is carried out at approximately 420° F. and at a pressure about 3 and 10 mm. Hg.

8. The process of claim 6 in which the distillation of step (d) is carried out at approximately 420° F. and at a pressure between about 3 and 10 mm. Hg.

9. The process of claim 1 in which the acid added in step (f) is $H_3PO_4$.

References Cited by the Examiner

UNITED STATES PATENTS 2,634,278  4/1953  Kuhrt _____ 260—410.7

ALEX MAZEL, *Primary Examiner.*

HENRY JILES, JOSEPH BRUST, *Assistant Examiners.*